Aug. 30, 1966  P. H. PALEN  3,268,988
PRESSURE CONTROL SWITCH
Original Filed July 22, 1959
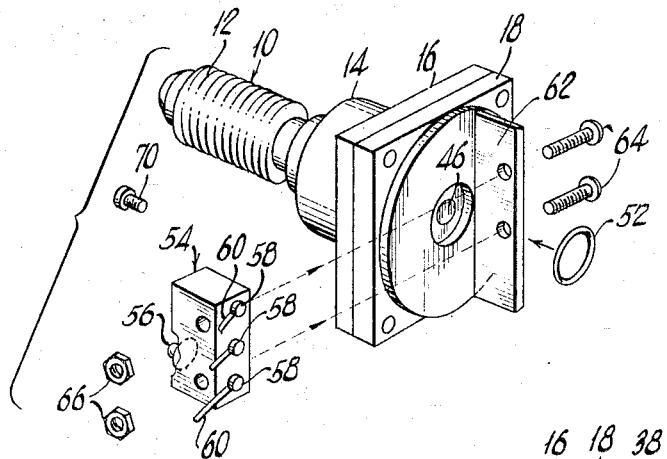
INVENTOR
PETER H. PALEN
BY
Nolte & Nolte
ATTORNEYS

United States Patent Office 3,268,988
Patented August 30, 1966

3,268,988
PRESSURE CONTROL SWITCH
Peter H. Palen, 5 Crestview Road, Mountain Lake, N.J.
Original application July 22, 1959, Ser. No. 828,886, now Patent No. 3,118,030, dated Jan. 1, 1964. Divided and this application Nov. 19, 1963, Ser. No. 327,865
2 Claims. (Cl. 29—155.5)

This is a division of U.S. patent application No. 828,886 of Peter H. Palen, filed on July 22, 1959, now U.S. Patent 3,118,030, and entitled "Pressure Control Switch." This invention relates to a method of constructing electrical switch assemblies. More particularly, this invention relates to a method for constructing a switch and actuator assembly of the type, for example, disclosed in the above referenced application.

It is an object of this invention to provide a simplified method of assembling an electrical switch and actuator in which the assembly is vibration and shock resistant.

Another object is to assemble a switch and actuator so that the resultant construction is environment proof (e.g. moisture, sand and dust), and wherein the contact points are sealed for protection against explosions.

In accordance with the invention a small precision snap switch is mounted on an actuator mounting plate which includes a recess adjacent the plunger of the switch. A sealing O-ring is positioned in the recess, and the switch placed in tight sealing contact with the sealing ring. With the parts thus positioned, the complete switch is encapsulated in a heat sealing resin, the leads being suitably conducted outwardly through the resin material, and the mounting plate secured to the body of the actuator assembly. The switch is thus very easy to fabricate and the resin encapsulation provides a shock proof and explosion proof switch.

The arrangement permits precise positioning of the switch in relation to the actuator before the switch is encapsulated at the end of the switch device. The parts are arranged to insure that the switch will be protected against an over-travel of the actuator. After the switch is encapsulated the alignment of the parts is fixed and the assembly becomes incapable of becoming unadjusted, regardless of the vibration to which it is subjected and regardless of the severe conditions which it may encounter.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is an exploded perspective view of a pressure actuated switch constructed in accordance with the invention;

FIG. 2 is a transverse section of the switch indicated in FIG. 1;

FIG. 3 is a vertical section taken on the line 3—3 of FIG. 2; and

FIG. 4 is an enlarged fragmentary detail of a portion of the switch indicating the alignment of the actuating rod and the switch actuating button.

Referring to the drawings in detail, the invention as embodied therein includes a housing member generally designated 10 externally threaded as at 12 to permit its being secured to a suitable pressure actuating means (not shown). The housing 10 includes a widened portion 14 having a flange 16 adapted to receive a structural mounting and cover plate 18.

A hollow stationary member generally designated 20 having a bore 21 is fitted within the housing 10. The member 20 includes an elongated cylindrical portion 22 located within a cylindrical bore 24 of the housing 10. The member 20 also includes an intermediate larger diameter portion 26, which is located within an intermediate larger diameter bore 28 of the housing 10 and an end portion 30 which is surrounded by a substantially cylindrical flanged cup or hat-shaped actuating member generally designated 32. While the member 20 and the housing 10 are indicated as separate parts, there is no relative movement therebetween and they may be advantageously made of unitary integral construction. In the present instance, they are made of two parts for ease of manufacture and assembly purposes.

The actuating member 32 includes an externally flanged portion 34 upon which is positioned a compression spring 36 which is biased between the flange portion 34 and an internal recessed portion 38 of the cover plate 18. The spring 36 urges the cup-shaped actuating member in a direction toward a wall 39 of the sleeve housing 10.

The cover 18 is provided with a raised shoulder portion 41 which forms a stop to limit movement of the actuating member 32. An O-ring 40 of a resilient material such as rubber, plastic or the like is positioned between the elongated cylindrical portion 22 and the walls of the intermediate bore 28 of the housing 10 for pressure sealing purposes.

The actuating pressure which, of course, is the same throughout the internal system prevents member 20 from moving relative to member 10 because the areas on which the pressure acts tending to move member 20 to the left (as indicated in FIG. 2, i.e., faces 31, 33, and 35) are greater in area than the area of face 23 on which the pressure acts to move it to the right.

In accordance with the invention, an O-ring 42 is positioned in recess 44 defined in the outer wall of the portion 30 of member 20, forming a static friction contact between member 20 and the highly polished inner surface of the actuating member 32, which together with the spring 36, prevents movement of actuator 32 until a pressure force is exerted in the system against actuator 32 sufficient to overcome the major restraining force of the spring 36 and the minor static restraining force of the O-ring 42. By choosing a low rate spring 36, the actuating member 32 does not move at all until a pressure is applied approximately 1 to 1½ percent below the required actuating pressure. Once movement starts, the static friction of the O-ring is suddenly overcome and the forces exceed the combination of the spring load plus the dynamic friction, and the cylinder snaps over to its terminal position where the cylinder comes to rest against a shoulder 41 of the cover plate 18. As pressure continues to rise, there is no further motion of the cylinder.

In accordance with the invention the actuating member 32 is provided with an actuating rod or pin 46 of precise predetermined length which extends outwardly through a central opening 48 in the cover plate 18. The outer portion of the cover plate 18 is provided with a central recess in which is positioned a small diameter O-ring 50 backed by a retaining washer 51 which provides sealing contact with the actuating rod 46.

The cover plate 18 is also provided with an outer larger recess in which is positioned an O-ring 52. The O-ring 52 is arranged in the recess to form bearing contact for the mounting of a switch generally designated 54 having a control button 56 which is centrally aligned over the O-ring 52. O-ring 50 and O-ring 52 seal off the cavity accommodating the pin 46 and the push button 56 to effect an explosion proof cavity for the switch 54, which is in communication with the interior of the switch only via the clearance space surrounding button 56. The switch 54 contains the usual contact making portions in the interior thereof, which are not illustrated since they form no part of the present invention. The switch 54 contains typically three terminals 58 which are electrically connected by individual leads 60. The switch 54 is connected to an upstanding mounting plate 62 which is formed on the outer face of the cover plate 18 by bolts 64 and nuts 66. Care is taken to locate the button 56 of the switch 54 in position at a precise distance from the inner end of the pin 46 in order to insure that the switch will always be tripped when the actuator 32 is moved to an actuating position but that the actuator will be arrested by the shoulder 41 without exceeding the overtravel design limits of the switch button. As the actuating member travel is limited by the shoulder 41, the length of the pin 46 is made of a length to insure proper actuating movement of the pin against the switch button 56 without overtravel. This feature permits subjecting the instrument to overload actuating pressure conditions without in any way damaging the switch 54.

Once the switch 54 is mounted on the mounting plate 62 the area surrounding the switch is encapsulated with a resin material 68 of high dielectric quality, such as an epoxy-resin. The resin is thereafter heat cured to a hard finish. The terminal wires 60 are positioned before encapsulation so that they extend outwardly through the finished hardened resin material.

During the casting process, O-ring 52 prevents the fluid resin from seeping into the chamber containing the button 56 and hence into the interior of the switch 54. Casting or encapsulation is performed with the upper portion of the structural cover 18 clamped in a cylindrical mold. After encapsulation the unitized head plate assembly, including the encapsulated switch 54 is attached to the flange 16 of the housing 10 such as by screws 70. A sealing gasket 72 is interposed between the flange 16 of the housing and the cover plate 18.

The whole assembly may be connected to a pressure control source, the threaded end extending in a similarly internally threaded member. Ventilation to the atmosphere of the cavity surrounding the actuator 32 is accomplished through a passage 74 which extends through a portion of the wall 39 of the housing member 10.

It should be appreciated that in accordance with the requirements of the particular application, the head assembly may be provided with two or more switches actuated together by one pressure cell, or independently by two or more pressure cells. Head assemblies may be provided with electric connectors, or may include, within the encapsulation, such other electrical components and wiring as may be advantageous. Various configurations of body assemblies and cylinders and pistons may be interchanged for any desired pressure connections, mounting arrangements or pressure range. Small changes in the desired pressure settings are obtained by using different springs or adding shims to a given spring.

The switch constructed in accordance with the invention is highly vibration and shock resistant. The parts are assembled in a manner in which the switch is permanently and securely positioned and the connections are prevented from loosening. The complete switching environment is sealed against contamination by moisture, sand, etc. The switch is effectively explosion proof, since the contact elements are sealed in with a resin material.

The advantages which derive from such a design are many. Since there is only one motion at the trip pressure or head point of the pressure switch, and since the motion tends to be similar to sensitive snap action, the assembly is completely insensitive to vibration forces below and above the trip point. Over pressure in the range of several hundred to one, for example, has absolutely no effect on the repeatability of the unit, since the spring or force reference element in the pressure switch cannot be overstressed. Long life is assured and wearing of the O-ring seal is negligible because of the very high surface finish maintained in the cylinder bore.

Furthermore, the switch itself is not subject to overload since the actuator is mechanically stopped before the over-travel limit of the switch is reached.

While a specific embodiment of the invention has been shown and described in detail to illustrate the application of the invention principles, it will be understood that the invention may be embodied otherwise without departing from such principles.

What is claimed is:

1. A method of assembling an electrical button operated switch with a pressure actuator having an actuating pin, comprising the steps of: positioning a sealing member around an opening in a cover plate of said actuator through which said pin of said pressure actuator extends, positioning said switch with the button thereof in alignment with said opening and said pin, the body of said switch being pressed against said sealing member with the switch body fixedly spaced from said cover plate to define an encapsulating recess between said switch body, said cover plate and said sealing member, and encapsulating said switch and said recess with a hardenable resin to seal said recess and said switch.

2. A method of assembling an electrical button operated switch with a pressure actuator having an actuating pin, comprising the steps of positioning a sealing ring around an opening on one surface of a cover plate, positioning said switch with the button thereof in alignment with said opening, the body of said switch being pressed against said sealing ring with the switch body fixedly spaced from said one surface to define an encapsulating recess between said switch body, said surface and said sealing ring; encapsulating said switch and said recess with a hardenable resin to seal said recess and said switch; hardening the resin; and assembling and securing the cover plate in cooperating arrangement with the pressure actuator, whereby said pin of said pressure actuator is adapted to extend through said opening into an abutting relationship with said button.

References Cited by the Examiner

UNITED STATES PATENTS

| | | | |
|---|---|---|---|
| 2,509,504 | 5/1950 | Jensen | 200—83.91 |
| 2,878,348 | 3/1959 | Haydon et al. | 200—168 |
| 2,896,008 | 7/1959 | Putz | 29—155.5 X |
| 2,944,125 | 7/1960 | Oliveau | 200—82.2 |
| 2,955,327 | 10/1960 | Beardslee et al. | 174—52.6 |
| 2,983,964 | 5/1961 | Vocht | 200—168 |

FOREIGN PATENTS 775,882  5/1957  Great Britain.

CHARLIE T. MOON, *Primary Examiner.*

WHITMORE A. WILTZ, J. W. BOCK, R. W. CHURCH, *Assistant Examiners.*